(12) United States Patent
Bargiel

(10) Patent No.: US 6,540,279 B1
(45) Date of Patent: Apr. 1, 2003

(54) UNDERSEAT STORAGE ARRANGEMENT

(75) Inventor: David A Bargiel, Troy, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/949,274

(22) Filed: Sep. 7, 2001

(51) Int. Cl.$^7$ .................................................. B60N 2/02
(52) U.S. Cl. ............................. 296/65.05; 296/37.15; 296/69
(58) Field of Search ...................... 296/37.1, 37.5, 296/37.6, 37.15, 37.14, 37.16, 65.01, 66, 65.05, 69, 65.09; 297/188.1, 188.13, 188.12, 188.09

(56) References Cited

U.S. PATENT DOCUMENTS

| 5,560,676 | A | | 10/1996 | Griffith et al. ............ 297/188.2 |
| 5,564,776 | A | | 10/1996 | Schlachter ................. 296/37.6 |
| 5,628,439 | A | | 5/1997 | O'Hara ....................... 224/275 |
| 5,669,537 | A | | 9/1997 | Saleem et al. .............. 224/539 |
| 5,902,009 | A | * | 5/1999 | Singh et al. ............. 296/37.15 |
| 5,973,917 | A | | 10/1999 | White ........................ 361/683 |
| 6,102,463 | A | * | 8/2000 | Swanson et al. ......... 296/37.15 |
| 6,106,044 | A | * | 8/2000 | Schlachter ............... 296/37.15 |
| 6,120,234 | A | | 9/2000 | Dinverno .................... 414/538 |
| 6,139,096 | A | * | 10/2000 | Anderson et al. ......... 297/188.1 |
| 6,161,896 | A | * | 12/2000 | Johnson et al. .......... 297/188.1 |
| 6,386,612 | B2 | * | 5/2002 | Hofmann et al. ........ 296/37.15 |
| 6,390,547 | B1 | * | 5/2002 | Spykerman ............. 296/37.15 |
| 6,435,609 | B1 | * | 8/2002 | Gasser .................... 297/188.1 |

* cited by examiner

Primary Examiner—D. Glenn Dayoan
Assistant Examiner—Jason Morrow
(74) Attorney, Agent, or Firm—Thomas A. Jurecko

(57) ABSTRACT

The present invention provides a storage enclosure for a motor vehicle within the interior of the motor vehicle. The invention also provides a work station that defines the top portion of the enclosed storage area. This top work surface is pivotally attached to the upper area of the storage enclosure and provides access to the enclosed interior volume of the area. The work surface area is preferably a trifurcated work station. The work surface area that provides a top to the interior storage unit may be fully unfolded to provide an extended work surface area by a user. When the storage area is covered, the closure may form a supportive platform for use as a work station. This work station provides a flat surface area and includes a holding compartment that nests within the flat surface area. The support platform may by pivoted to allow access to the storage enclosure.

13 Claims, 5 Drawing Sheets

UNDERSEAT STORAGE ARRANGEMENT

BACKGROUND OF THE INVENTION

1. Field of the Invention

The present invention generally relates to an underseat storage arrangement. More particularly, the present invention relates to an apparatus providing access to an underseat storage area. The apparatus may also fold out to provide a work surface preferably in the back seat of an extended cab pick-up.

2. Discussion

Today, many business people spend a great deal of time traveling in and transacting business from a motor vehicle. These persons frequently have meetings and offices remote of their vehicle during the workday or may conduct business from the vehicle during the day. Such conditions of working from a vehicle during the day necessitate access to files, tools, and perhaps notebook computers. There is a need for a business person to be able to easily transport and access such common business tools preferably in a stored and organized manner allowing the business person to readily locate all the items and perform business operations in a professional manner.

A limitation exists in the use of some utility motor vehicles, including light duty trucks, where there is a lack of controlled or organized storage space for such business items. The increasingly wide spread use of light duty, open load pickup trucks by tradesman as well as for personal transportation has increased the need for improvement in storage space in such vehicles where a preference is to store such valuable goods in an enclosed area other than in the open load bed or box of such vehicles.

Newly designed pickup trucks are provided with a second, or passenger door and passenger seat arrangement. This modern second seat design provides an advantageous and additional area for storage and work place stations for use by the modern business man.

Previous storage enclosures for pickup trucks include tool boxes for placement in open load bed motor vehicles such is that described by U.S. Pat. No. 5,564,776 to Schlachter issued Oct. 15, 1996 and entitled "Storage Enclosure for Open Loadbed Motor Vehicle." Schlachter teaches an after market tool box loaded within the truck bed and easily accessible by a user when the tailgate of the truck bed is in an open position. Similarly, U.S. Pat. No. 5,669,537 to Saleem et al. issued Sep. 23, 1997 and entitled "Portable Multi-Position Vehicle Storage Unit" teaches an after market unit available for use in the rear storage area such as a trunk in a sedan type vehicle or the area behind the seats in the passenger compartment of a van, jeep or hatchback type vehicle. This portable multi-position vehicle storage unit provides vertical walls defining cargo space for supporting and transporting items. Additionally, U.S. Pat. No. 6,120,234 to Dinverno issued Sep. 19, 2000 and entitled "Van-Mounted Service Carts for Skilled Tradesmen and Ramp Mechanisms for Use with the Same" teaches a moveable service cart that may be transported within the bed of a pickup or van and includes a ramp system for removing the service cart from the vehicle.

Other popular designs provide portable desks for use within a motor vehicle. These designs generally teach an after market portable desk for use preferably within the passenger seat of a vehicle. These desks are secured to the passenger seat via the passenger seat belt and employ a locking arrangement similar to a child safety seat. U.S. Pat. No. 5,628,439 to O'Hara issued May 13, 1997 and entitled "Portable Desk and File Holder for Use in a Seat is a typical example of these after market work stations. O'Hara teaches a portable desk and cooperative file folder holder that may be purchased by a user to secure work items in a passenger seat during travel time.

Other examples of after market desks for use in a motor vehicle may be found in U.S. Pat. No. 5,560,676 to Griffith et al. issued Oct. 1, 1996 and entitled "Desk for Use in Vehicle" and U.S. Pat. No. 5,973,917 to White issued Oct. 26, 1999 entitled "Portable Motor Vehicle Work Station." A disadvantage of these work stations is that they are portable and must be secured within the motor vehicle by a safety restraint system. As such, these units may move, vibrate, squeak or rattle during vehicle operation. Further, these work stations do not provide enough storage space for the inclusion of valuable tools or electronics. Thus, these valuables may not be hidden from public viewing and maybe susceptible to theft. Further, exterior truck storage such as that described by Dinverno and Schlachter do not allow for storage of sophisticated appliances such as telephones, computers, and GPS Navigation systems where cold air may damage the battery life of the appliance.

SUMMARY OF THE INVENTION

It is therefore an object of the present invention to provide a storage enclosure for a motor vehicle within the interior of the motor vehicle. Such storage enclosures serves to hide items thus deterring theft. Further, because the storage space is in the interior of the vehicle it is advantageous to store electronic items and other sophisticated tooling rather than to store such items in the exterior of a truck bed. It is another object of the invention to provide a work station that defines the top portion of the enclosed storage area. This top work surface is pivotally attached to the upper area of the storage enclosure and provides access to the enclosed interior volume of the area.

It is another object of this invention to provide a trifurcated work station. The work surface area that provides a top to the interior storage unit may be fully unfolded to provide an extended work surface area by a user. Thus, the present invention provides a storage area with pivotable cover. When the storage area is covered, the closure may form a supportive platform for use as a work station. This work station provides a flat surface area and includes a holding compartment that nests within the flat surface area. The support platform may by pivoted to allow access to the storage enclosure.

Additionally, the support platform is trifurcated and may be pivoted into an extended generally horizontal position to provide a portable work station. In a preferred form of the present invention, the trifurcated support platform is formed of a base, a mid-section and a support leg. The base forms the top to the storage enclosure and is pivotally connected to one edge of the storage enclosure to allow for opening and closing of the storage enclosure top. The base thus acts as a top to the storage enclosure while supporting the mid section and support leg of the trifurcated portable work station. The mid-section is pivotally connected to the base opposite the base pivotal connection to the storage enclosure. Thus the mid-section pivots open for extension to form the portable work station in a manner opposite to the base pivot. The mid-section forms a smooth surface that may be used as a writing table, for example, when the base is in a closed position and forming the top of the storage enclosure.

The support leg is pivotally connected to the mid-section opposite the base and forms a surface portion nested within the mid-section of the work station platform. Preferably the support leg provides an indented surface area for seating such items that may have a tendency to roll.

The mid-section includes a handle for pivoting the trifurcated platform from the generally horizontal position wherein all three sections form a top to the storage area to an extended horizontal position forming an extended work station area. When the trifurcated platform is in the extended general horizontal position, the base continues to act as a top to the storage enclosure. The base and mid-section act as a work station area while the support leg extends generally vertically from the mid-section downward towards the floor of the motor vehicle and supports the work station platform in an extended generally horizontal position.

The storage area with work station is preferably provided within the interior of a motor vehicle under the rear seat of an extended cab pickup. In this instance, the rear seat bottom portion is folded upwardly toward a seat back portion thus exposing a storage enclosure defined by a wall portion extending between the floor of the vehicle and the seat bottom when the seat bottom portion is not in a folded position. The work station is stored in a folded, nested position, and acts as a top to the storage enclosure. As such, the storage enclosure with the work station of the present invention provides interior storage and an interior work station for use by the vehicle owner.

Additional benefits and advantages of the present invention will become apparent to those skilled in the art to which this invention pertains from reading the subsequent description of the preferred embodiment in conjunction with the accompanying drawings.

DETAILED DESCRIPTION OF THE PREFERRED EMBODIMENT

Figure 1:
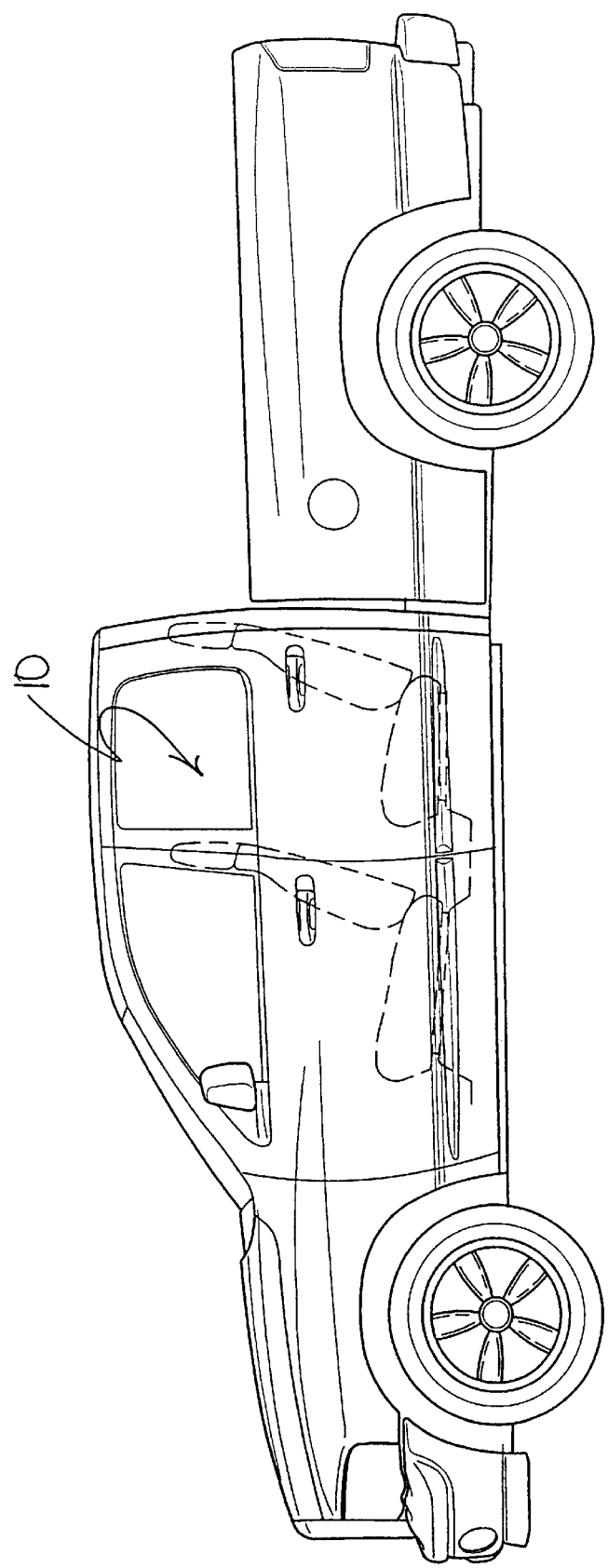
FIG. 1 is a side view of an extended cab truck showing the preferred location of the preferred embodiment of the present invention.
Figure 2:
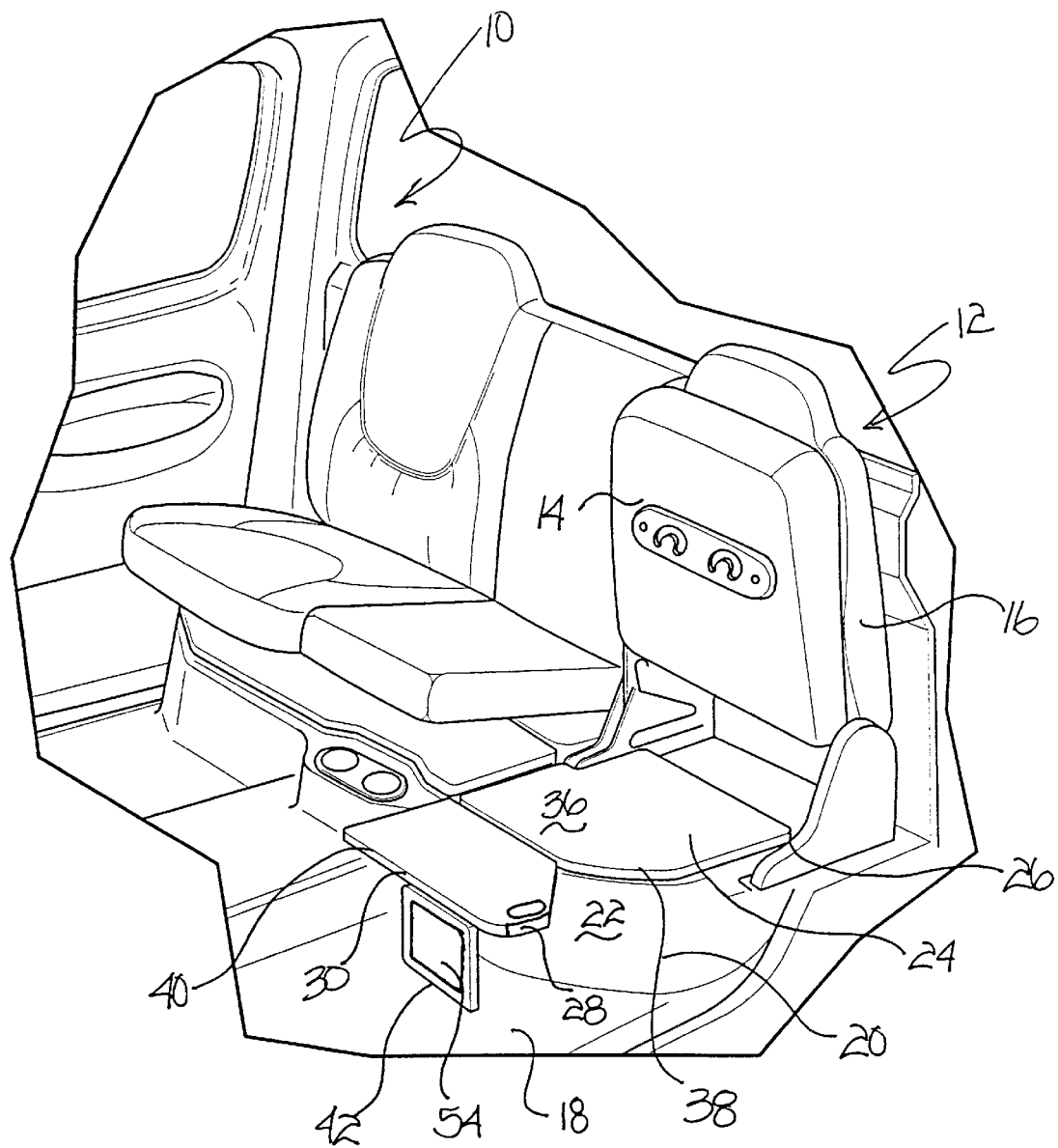
FIG. 2 is an environmental view of an automobile interior illustrating a preferred embodiment of the present invention.

With reference to FIGS. 1–7, the interior of a motor vehicle 10 is there shown. In the preferred embodiment, the interior preferably includes a rear seat of an extended cab pickup that is accessed by rotating the front seat forward or is provided with a second rear door as shown in FIG. 1. Interior 10 shows a seat assembly 12 having a seat bottom portion 14 capable of folding upwardly toward a seat back portion 16. Floor 18 supports seat assembly 12 and a wall portion 20 extends between the floor 18 and seat bottom portion 14 when the seat bottom portion 14 is not in a folded position. A storage enclosure 22 is defined by wall portion 20 and seat assembly 12. The top area of storage enclosure 22 is enclosed by a closure or platform 24 that extends generally horizontally between seat assembly 12 and wall portion 20. Platform 24 is pivotally attached to seat assembly 12 at pivot point 26.

Figure 3:
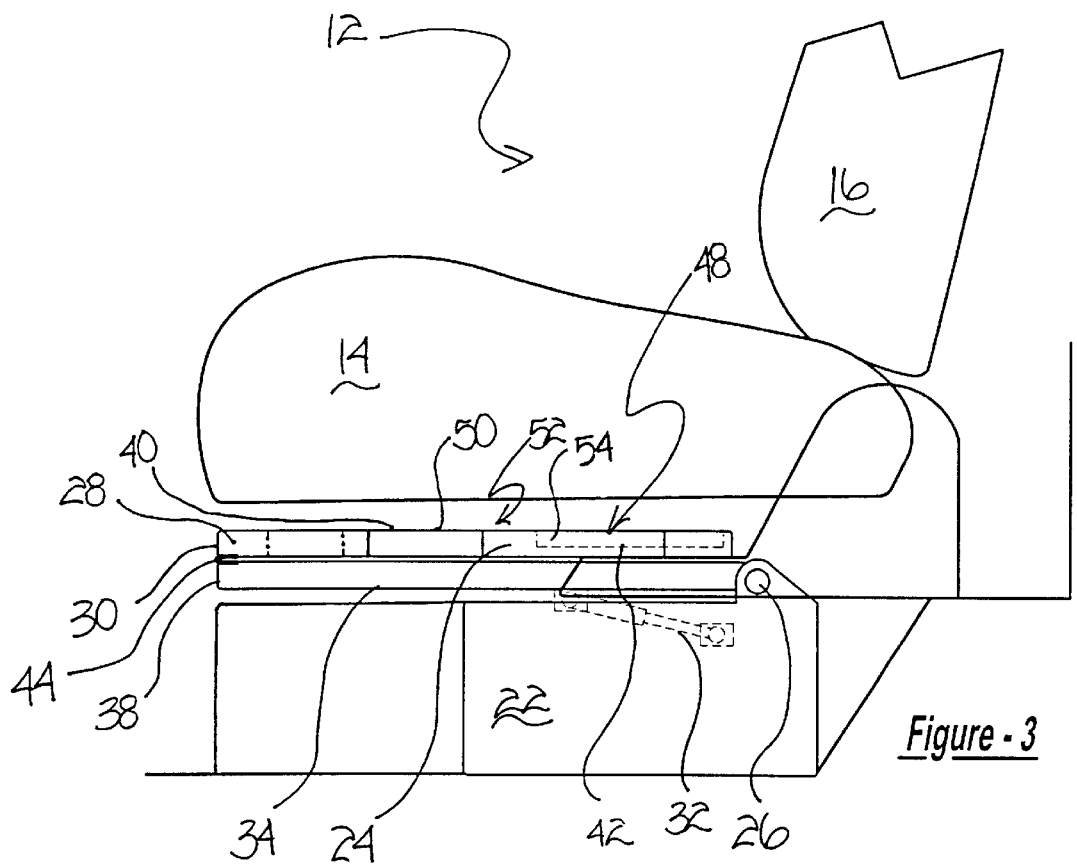
FIGS. 3 and 4 are cutaway side views of a rear seat showing a preferred embodiment of the present invention.
Figure 4:
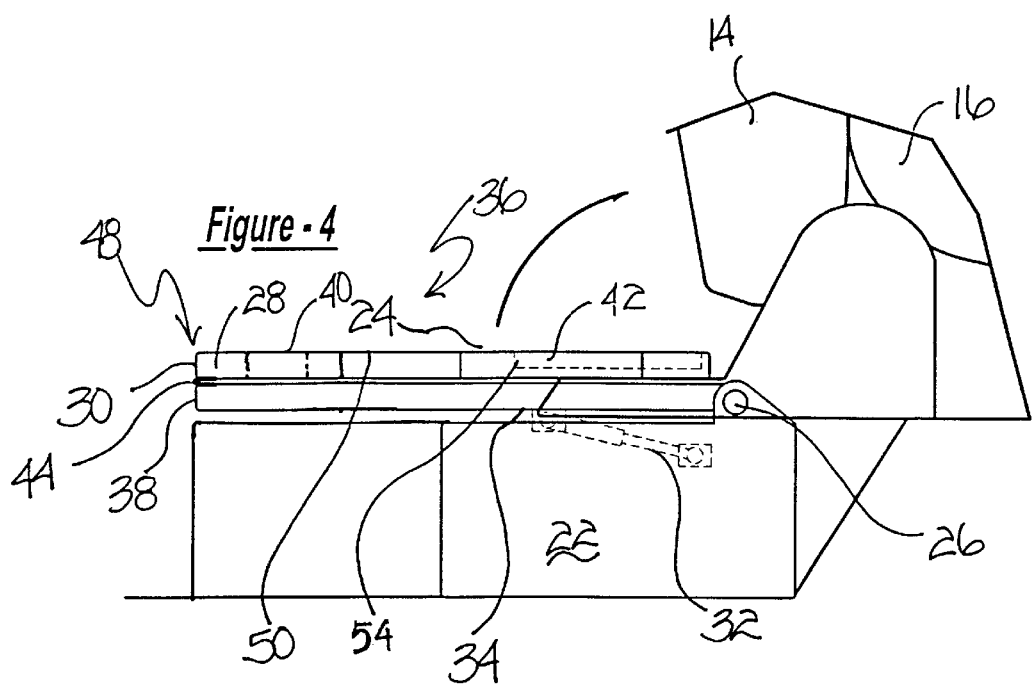
Figure 5:
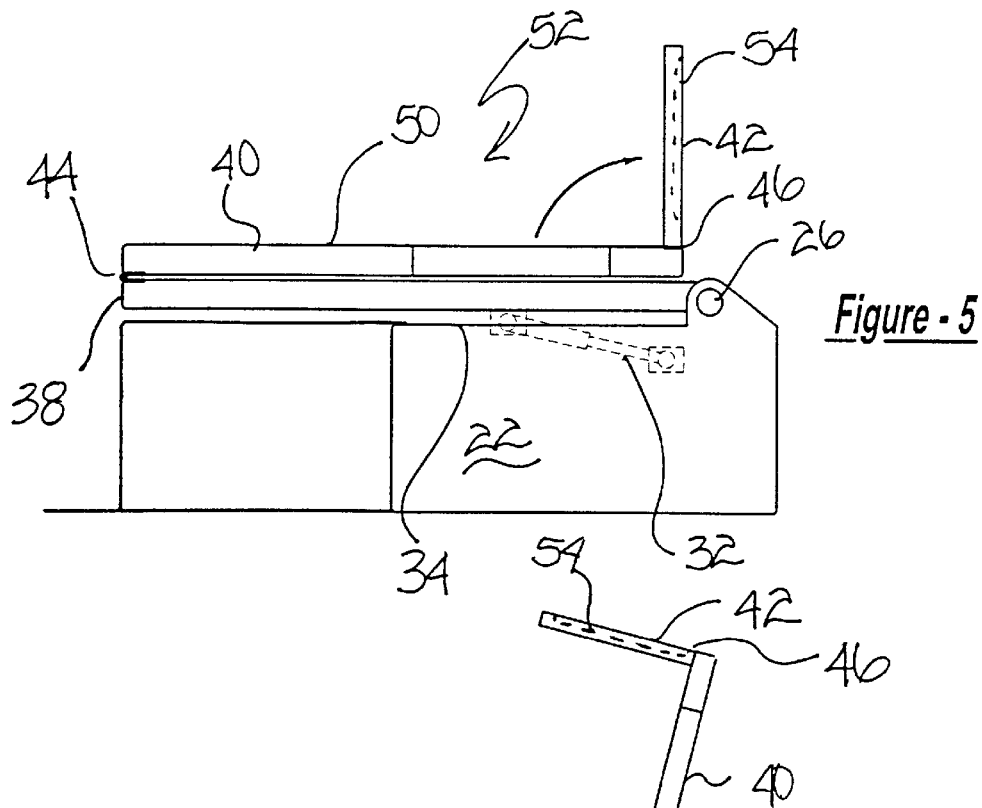
FIGS. 5 and 6 are a perspective view of the work station in a semi-folded condition.
Figure 6:
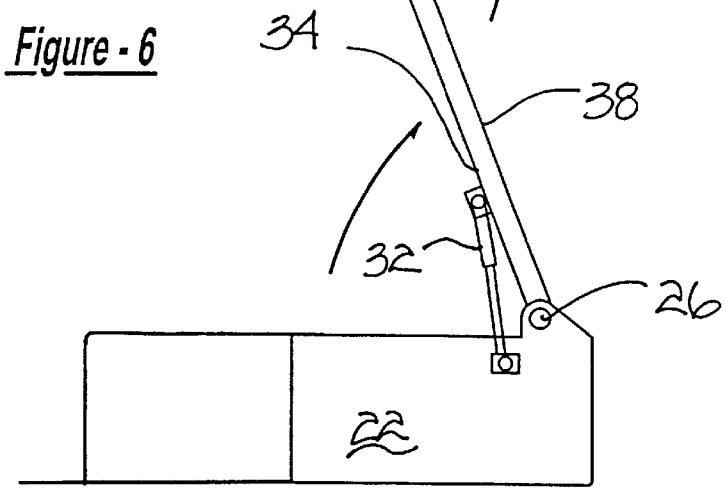
Figure 7:
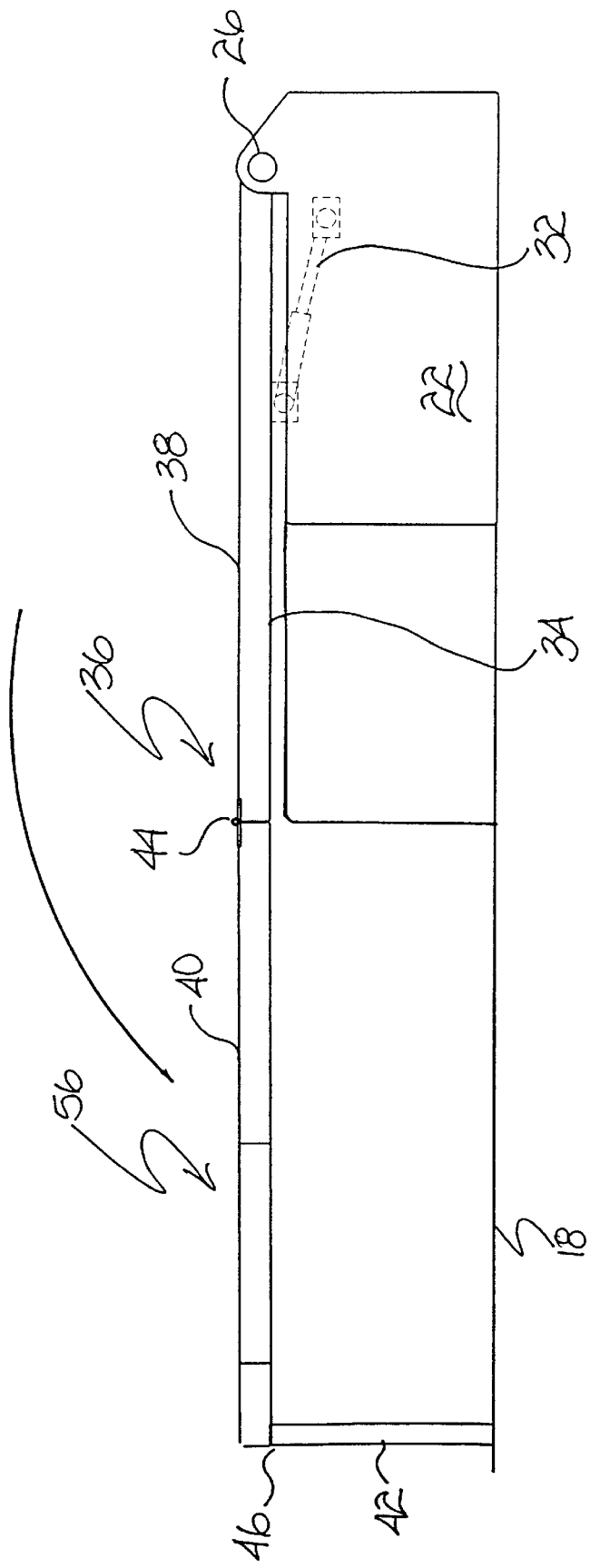
FIG. 7 is a perspective view of the work station in an extended generally horizontal position.

Platform 24 allows access to storage closure 22 by pivoting about pivot point 26 to a generally vertical position. Access to storage enclosure 24 is provided by rotating seat bottom portion 14 towards seat back portion 16 as shown in FIGS. 3–4. Platform 24 is then rotated about pivot point 26 to a generally vertical position. A handle 28 is provided at one end 30 of platform 24 to allow easy rotation of platform 24 to the generally vertical position. Preferably, a piston arrangement 32 is provided and extends between pivot point 26 and bottom portion 34 of platform 24. Piston 32 supports platform 24 in a generally vertical position and holds open the platform 24 to allow a user extended access to storage enclosure 22 as best shown in FIG. 6.

The piston arrangement 32 is shown as an example. A canted arm of any form or any other structure may be used to aid in propping open platform 24 for access to storage in enclosure 22.

In the preferred embodiment of the present invention, platform 24 also provides a portable work station for use in the interior of a motor vehicle 10. Preferably portable work station 36 is trifurcated for use in an expanded generally horizontal position. Portable work station 36 is accessed by folding seat bottom portion 14 upwardly towards seat back portion 16. Portable work station 36 is preferably trifurcated into a base 38 a mid-section 40 and a support leg 42. Base 38 is pivotally connected to seat assembly 12 at pivot point 26 by piston arrangement 32. Mid-section 40 is pivotally connected to base 38 at pivot point 44 opposite pivot point 26 of base 38. Support leg 42 is pivotally connected to mid-section 40 at pivot point 46 opposite pivot point 44 of mid section 40. Base 38, mid-section 40 and support leg 42 form a tri-fold top assembly 48 for storage enclosure 22. As shown in FIG. 3, tri-fold top assembly 48 forms platform 24. Mid-section 40 provides a flat surface area 50 for use as a mini work station generally shown at 52. Support leg 42 nests within mid-section 40 and preferably provides an indented area 54 for supporting objects, such as pens or pencils, that have a tendency to roll when using the mini work station 52.

Portable work station 36 is formed by pivoting mid-section 40 about pivot point 44 and pivoting support leg 42 about pivot point 46. This is easily preformed by grabbing handle 28 and rotating the tri-fold top assembly 48 outwardly to an extended generally horizontal position as shown best in FIG. 6. When portable work station 36 is in its fully extended generally horizontal position, base 38 continues to act as a top to storage and enclosure 22. Mid-section 40 provides an extended work table area 56 while support leg 42 preferably extends in a generally vertical direction downward from mid section 40 to support the portable work station 36 on floor 18 of the interior of motor vehicle 10.

To nest tri-fold top assembly 48, extended portable work station 36 is rotated into mini work station formation 52 by again grabbing handle 28 and rotating mid-section 40 toward seat bottom portion 14 when seat bottom portion 14 is folded upwardly toward seat back portion 16. Rotation of the tri-fold top assembly 48 into the mini work station assembly 52 then allows access to storage and closure 22 by pivoting tri-fold top assembly 48 via handle 28 upwardly in a generally vertical direction. Storage enclosure 22 may be completely hidden from view when portable work station 36 is formed into tri-fold top assembly 48 and acts as a platform 24. Seat bottom portion 16 is then rotated downwardly to form a general seat assembly 12 within the interior of motor vehicle 10.

While the invention has been described in a specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt to a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. A portable work station for use in the interior of a motor vehicle, said motor vehicle comprising a seat assembly having a seat bottom portion capable of folding upwardly toward a seat back portion, a floor supporting said seat assembly, and a wall portion extending between said floor and said seat bottom portion when said seat bottom portion is not in a folded position, said portable workstation comprising a platform extending in a generally horizontal position between said seat assembly and said wall portion, said platform is trifurcated for use in an extended generally horizontal position, and accessible when said seat back is in said folded position and said trifurcated platform comprising a base, a mid-section and a support leg, said base pivotally connected to said seat assembly and pivotal between a generally horizontal position and a generally vertical position.

2. The base of claim 1, further comprising a top to a storage enclosure when said base is in said generally horizontal position; said storage enclosure formed by said seat assembly and said front wall.

3. The base of claim 2, wherein said base provides access to said storage enclosure when said base is in said generally vertical position.

4. The mid-section of claim 3, wherein said mid-section is pivotally connected to said base opposite said seat assembly and forms a flat surface portion of said workstation platform when said platform is in said generally horizontal position.

5. The support leg of claim 4, wherein said support leg is pivotally connected to said mid-section opposite said base and forms a surface portion of said workstation platform when said platform is in said generally horizontal position.

6. The mid-section of claim 5, further comprising a handle for pivoting said trifurcated platform from said generally horizontal position to an extended horizontal position.

7. The portable workstation of claim 6, wherein said base, said mid-section and said support leg are folded atop each other to form a top to said storage enclosure and a level platform when said platform is in said generally horizontal position.

8. The portable workstation of claim 7, wherein said base and said mid-section form an extended horizontal platform when said platform is pivoted into said extended horizontal position, said support leg extending generally vertical to said extended horizontal platform for supporting said platform within said motor vehicle.

9. A motor vehicle rear seat compartment comprising a seat assembly having a seat bottom portion capable of folding upwardly toward a seat back portion, a floor supporting said seat assembly, and a wall portion extending between said floor and said seat bottom portion when said seat bottom portion is not in a folded position, said seat assembly comprising:

a platform extending in a generally horizontal position between said seat assembly and said wall portion, said platform is trifuireated for use in an extended generally horizontal position and accessible when said seat back is in said folded position, said trifircated platform comprising a base pivotally connected to said seat assembly and pivotal between a generally horizontal position and a generally vertical position, a mid-section pivotally connected to said base opposite said seat assembly and forming a flat surface portion of said platform when said platform is in said generally horizontal position, and a support leg pivotally connected to said mid-section opposite said base and forming a surface portion of said workstation platform when said platform is in said generally horizontal position; and a storage enclosure defined by said wall portion, said seat assembly and said platform.

10. The seat assembly of claim 9, wherein said storage enclosure forms an enclosed opening under said seat bottom and is accessible by folding said seat bottom upwardly toward said seat back portion and pivoting said platform with said base to said generally vertical position.

11. The mid-section of claim 9, further comprising a handle for pivoting said trifurcated platform from said generally horizontal position to said extended generally horizontal position.

12. The seat assembly of claim 11, wherein said base and said mid-section form an extended horizontal platform when said platform is pivoted into said extended generally horizontal position.

13. The seat assembly of claim 12. wherein said support leg extends generally vertical to said extended generally horizontal platform for supporting said platform within said motor vehicle.

* * * * *